Dec. 16, 1941.   H. G. BUSIGNIES   2,266,410
AUTOMATIC RADIO-GUIDING SYSTEM FOR VEHICLES
Filed March 11, 1939   2 Sheets-Sheet 1

Inventor
H. G. Busignies
by
Attorney

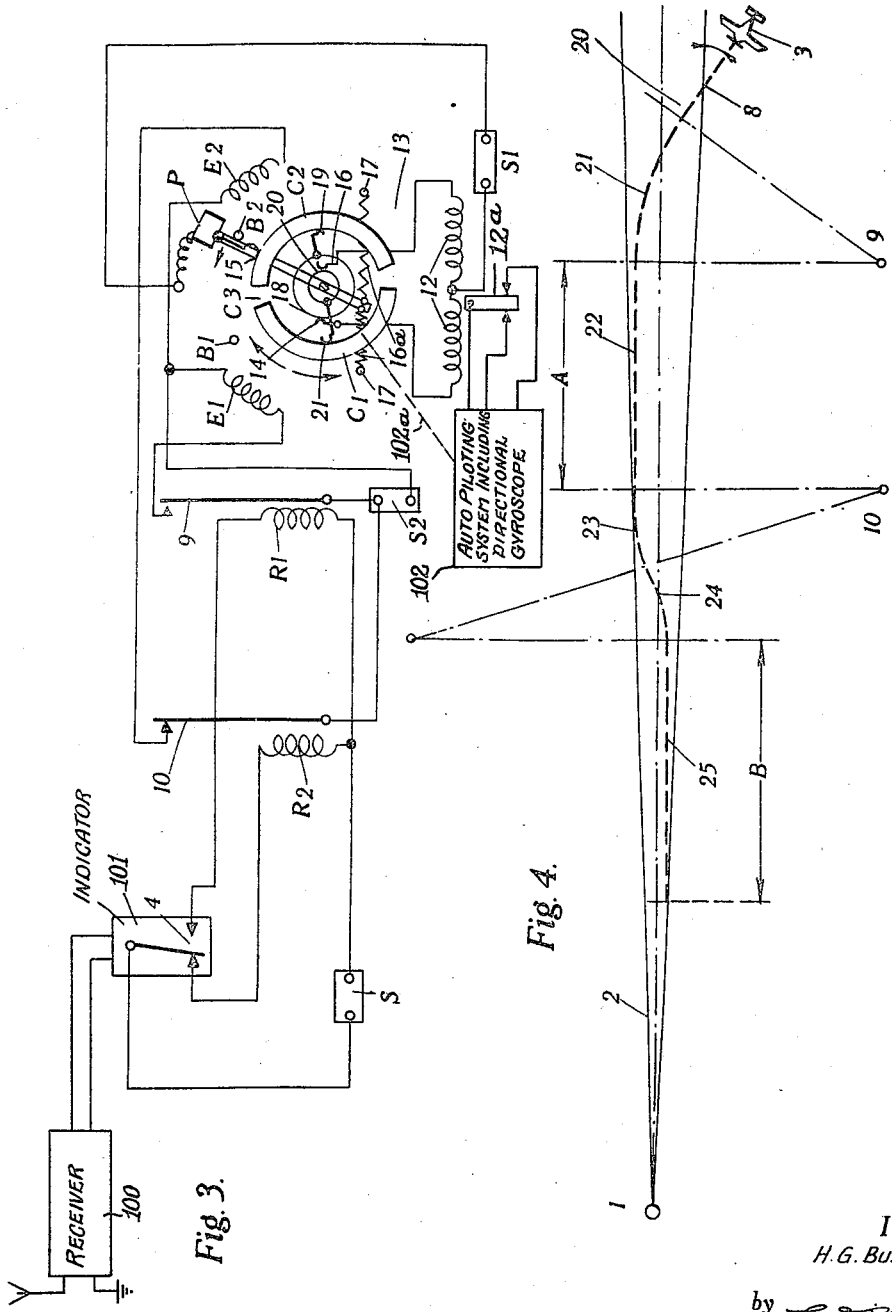

Patented Dec. 16, 1941

2,266,410

UNITED STATES PATENT OFFICE 2,266,410

AUTOMATIC RADIO-GUIDING SYSTEM FOR VEHICLES

Henri Gaston Busignies, Paris, France, assignor to International Standard Electric Corporation, New York, N. Y.

Application March 11, 1939, Serial No. 261,265
In France April 6, 1938

4 Claims. (Cl. 250—2)

The present invention relates to a radio guiding system for a moving vehicle of the kind comprising a radio directive beam or zone transmitter and has for its object to provide a system of radio guiding in which the route of a vehicle is automatically maintained within narrow limits determined by radio-electric means.

Radio-electric systems for guiding vehicles such as certain known blind landing systems for guiding aeroplanes, employ radio beacons or radiating systems which have radiation diagrams, the radiation being modulated by different signals on the right and on the left of the route to be followed by the vehicle, the route being a zone which is characterised by signals which are of equal strength or by the absence of signals, or by a characteristic signal. The width of this zone or beam is indicated on the vehicle by an indicator connected to the output of a radio receiver: this indicator is insensitive in a zone whose width depends upon the sensitivity of the receiver, said sensitivity being adjustable. In this zone the pilot or operator perceives that the signals received from the two radiations when combined give a predetermined signal, which may be a continuous dash or the elimination of all signal or of any other characteristic and the pilot deviates on each side of the normal course according to whether a signal is received corresponding to the signal from one side or the other respectively of the direction zone.

On vehicles, so-called automatic piloting systems may be provided and adapted to maintain the machine continuously on a course determined by the pilot by automatically correcting any accidental deviation of the vehicle from this course once it has been decided upon and determined by setting the directional gyroscope or compass of the vehicle in one position, either directly or by means of a course repeater.

According to the present invention a radio guiding system for a moving vehicle of the kind employing a radio-directive beam or zone comprises a device on the vehicle responsive to the radio beam and automatic steering equipment on the vehicle, and means on the vehicle for automatically bringing into use said automatic steering equipment set to the direction of the beam when the vehicle enters the said directive beam, and for maintaining the equipment in use so long as the vehicle remains in the beam.

According to a feature of the invention a radio guiding system comprises on board the vehicle a radio receiver responsive to the directive beam or zone and associated with a device which changes its position when the vehicle enters the said beam or zone, and automatic steering equipment provided with means for adjusting the course to be followed by the vehicle along the said beam, and means associated with said device, which on change of position of said device when the vehicle enters the directive beam, brings into use the said automatic steering equipment, and a further device responsive to the position of the first mentioned device, said further device controlling the said equipment to vary the course of the vehicle as it deviates from the direction of the beam or zone.

According to a further feature of the invention, a radio guiding system for a moving vehicle employs a radio directive transmitter in which characteristic signals are transmitted one on each side of the directive axis, for instance complementary signals which, when received on the directive axis form a continuous dash, or the absence of a signal, and on board the said vehicle means is provided responsive to said characteristic signals and adapted to control automatic steering equipment according to the characteristic signal received so as to bring the vehicle within the width of the beam or zone determined by the sensitivity of said means, which comprises an oscillatable member, for example, the pointer of an indicator, adapted to actuate either directly or through the instrumentality of intermediate relays, the operation of the automatic steering equipment.

The invention will be explained in detail in the following description in which reference is made to the attached drawings in which:

Fig. 3 shows the circuit diagram of an alternative example of an automatic arrangement for starting the turning of the vehicle and incorporating other features of the invention; and Fig. 4 shows schematically an example of automatic guiding of a vehicle such as an aeroplane in accordance with the invention.

Figures 1, 2:
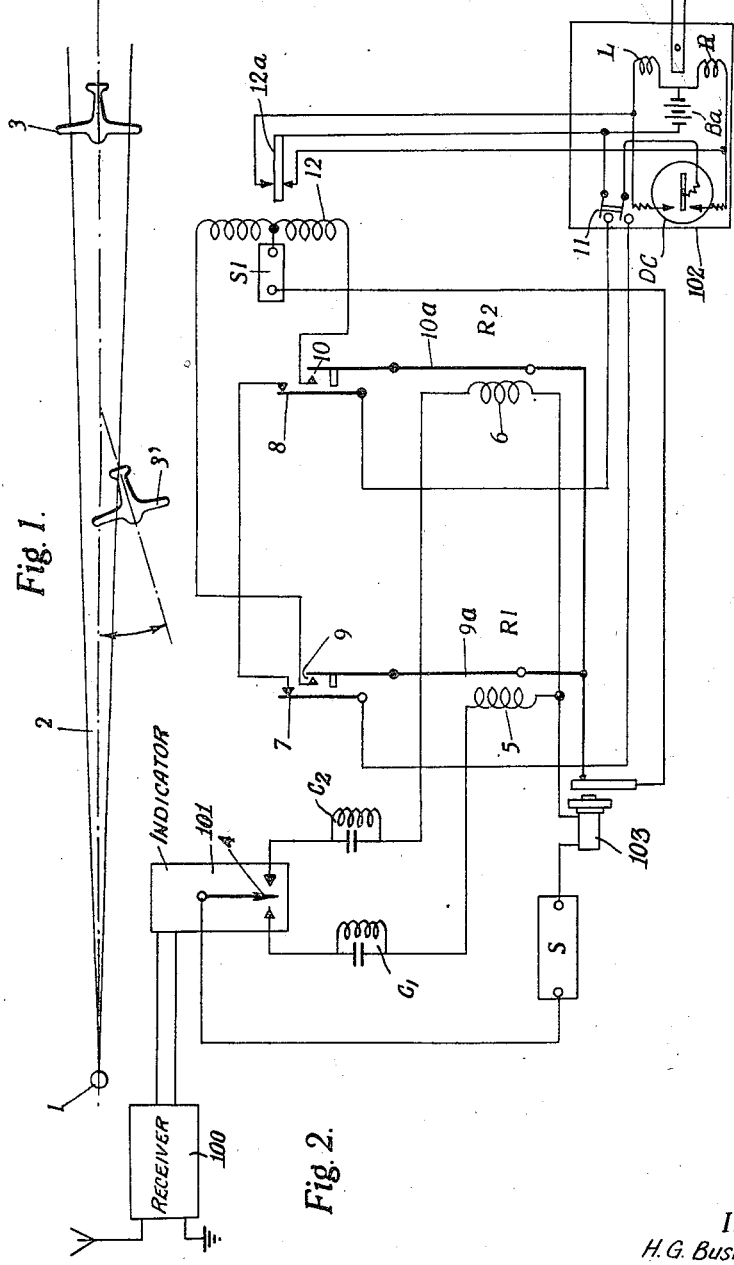
Fig. 1 shows schematically a guiding or directional path defined by a directional beam, and two characteristic positions of a vehicle, for example, an aeroplane.
Fig. 2 shows by way of example the circuit diagram of an automatic device for starting the turning of an aeroplane and incorporating certain characteristics of the invention.

In the following description, the vehicle under consideration is an aeroplane, but it is clear that the invention is not limited to automatic guiding of an aeroplane, but may be employed in the guiding of ships or the like.

As shown in Fig. 1, a radio-beacon 1 radiates a directional beam 2, which in a horizontal section is a sector subtending a very small angle at the centre which is the radio-beacon 1. Such a radio-beacon beam is directed in known geographical direction. It follows that a vehicle such as an aeroplane 3 once it has entered the beam 2, in order to remain in the beam need only have its steering apparatus set to the geographical course of said beam 2 either manually or by means of the automatic piloting system (shown at 102 in Figure 2) of the aeroplane which the pilot adjusts according to said course once he has been informed by the characteristic signal of the radio beacon received that he has entered the beam. However, a large number of causes, the chief of which is the effect of the wind, are capable of causing the aeroplane 3 to leave the beam, but only at a relatively small angle with respect to the direction of the beam as indicated in the position 3'.

In accordance with one of its features, the invention provides means for correcting the course of the machine. Fig. 2 shows the circuit diagram of an embodiment of the system permitting the aeroplane or vehicle to be maintained automatically in the beam or sector of which the apex is the radio-beacon 1, whatever the angle of the axis of the vehicle or aeroplane with respect to the axis of the beam 2.

In Fig. 2 the radio receiver 100 comprises a position indicator 101 actuated by the received signals. This indicator is provided in the example shown with a change-over contact device 4, the stationary contact members being connected to the energising windings 5 and 6 of relays R1 and R2 the circuits including a suitable source S of current. A change-over assembly has been shown by way of example in the drawings, but it is clear that any other suitable device may be employed, for example, a system of photo-electric cells, or other known switching arrangement suitably adapted for this purpose.

The relays 5 and 6 are respectively provided with a normally closed contact pair 7 or 8, and a normally open contact pair 9 or 10, the armatures 9a, 10a of said movable contact pairs being arranged to open the normally closed contact pairs 7 and 8 respectively. The contact pairs 7 and 8 are normally closed and complete a circuit for the actuation of the directional gyroscope (compass), or of the course repeater of the vehicle, which controls the automatic piloting system 102. The stationary contacts of the pairs 9 and 10 are respectively connected to the terminals of a winding 12 of a relay of the automatic piloting system having a control armature 12a, and herein termed the turning relay, the middle point of the winding of which is connected to one terminal of a source S1 of current and the other terminal of which is in turn connected to the movable armatures 9a, 10a, of the contact pairs 9 and 10.

The automatic piloting system shown within the rectangle 102 may be of any suitable known construction. Simply by way of example, this system is represented in the drawings as comprising a directional gyroscope or compass DC which may be manually set by the pilot to maintain the vehicle on a desired geographical course. The compass is provided with a pair of relatively fixed contacts and a cooperating movable contact controlled by the directional element of the compass. These contacts serve to control energizing circuits to energize turning windings R or L, depending on the direction of flight of the vehicle with respect to the fixed course. The energizing current for these windings is supplied by a suitable source represented by the battery Ba through a common energizing circuit including relay contacts 7 and 8 and manually operable switch 11. Windings R and L operate in a suitable manner to shift the steering mechanism (represented by the rudder S) to one side or the other from its normal central position. The contacts on turning relay 12 are connected to control the current supplied to windings R and L when this relay is energized through the indicator 101. When indicator 101 is operated to either side, one of relay contacts 7 or 8 opens the control circuit of the compass DC, but relay 12 takes over the control of the piloting system.

The operation of such an arrangement is as follows: When the vehicle is in the vicinity of the beam 2 in a region outside said beam, in which signals of a certain type are received by receiver 100 on the vehicle, the radio position indicator 4 closes one of its contacts thus energising one or other of the relays R1, R2. This relay operates, and at one of the pairs of contacts 9 or 10 completes the energising circuit of one or other portions of the winding 12 of the turning relay. The turning relay operates accordingly and the automatic piloting system starts turning in a corresponding direction so that the aeroplane is brought towards the beam.

The turning relay may not in certain cases consist of an electrical relay, but of a pneumatic, hydraulic or mechanical arrangement, and consequently the relay of which the energising winding is shown at 12 may merely be an intermediate control relay of the actual turning relay.

In the zone of the radio-beacon determining the route to be followed by the vehicle, neither of the relays R1 or R2 is energised as the indicator 4 is in its normal position. The automatic piloting circuit is then closed by the contacts 7 and 8 and if the interrupter at 11 is closed the gyroscope or the course repeater (compass) functions to actuate the automatic piloting system. The aeroplane or vehicle is then automatically directed according to the known method of automatic piloting.

The vehicle then follows a straight line until the moment in which this straight line intersects one of the boundary lines of the beam 2, one of the relays R1, R2 operates and causes the starting of the slow turning by the operations described above. This turning action restores the aeroplane to the inside of the beam and the aeroplane immediately resumes a fresh straight line course.

The speed of the turning must be adjusted in accordance with the type of aeroplane or of the vehicle, and the width of the directional beam. A very slow turning should be sufficient as the geographical course given by the gyroscope, or the course repeater is very exact.

For a suitable adjustment for the whole of the system the aeroplane thus guided remains inside the beam of the radio-beacon with a relatively small number of relay operations, owing to the fact that the automatic piloting system is sufficiently stable in the absence of important outside causes, for example in the absence of wind.

When outside causes, for example, strong wind, give the vehicle a considerable drift, causing numerous successive operations of the relays, that is to say, the vehicle is not following a path parallel to the axis of the beam, means should be provided to compensate for this drift.

In the case in which the vehicle is only guided over a short distance, for example, in the case of blind landing for aeroplanes, the pilot of the vehicle cannot, himself, search for the drift which he must take into consideration, in the course to be given to the vehicle during the periods of automatic piloting. This corrected course, can, for example, be given him from the ground and when the relays R1, R2 are not operating the vehicle can be given a corrected geographical course. However, such a correction although desirable is not indispensable, and if not given the vehicle passes along a regular path.

In the case in which the vehicle is guided over a long distance, the pilot has time to try to correct his drift by groping about without indication from the ground. Among other means for arriving at this correction, the simplest for the pilot, consists in regularly altering the course given by the gyroscope or the course repeater by several degrees for a certain number of times until the relevant relay R1 or R2 which was not operating, begins to operate, and having obtained this result, in decreasing by several degrees the course given by these successive displacements. For example, he can displace the course setting of the gyroscope 5° at a time, then reduce from 2-3° the course setting for which the relevant relay R1 or R2 begins to operate.

This displacement can also be automatically carried out by means of a clock mechanism regularly displacing with time the course of the vehicle, or of the mechanism sensitive to angular deviations of the axis of the vehicle. At the moment when the relevant relay which was inactive begins to operate, this operation can control the setting of the course varying device in a suitable position. The actuation of said automatic clock mechanism or of the drift correcting mechanism can be controlled by a meter which records a certain number of successive operations of the same relay governed by the radio guiding signals.

If the signals received from each side of the directional beam consist of intermittent signals, such as spaced dashes or dots, or any combination of spaced dashes or dots, the indications cannot actuate the indicator device placed at the output of a radio receiver in a continuous manner. In this case undesirable operations of the relays R1 or R2 would occur, the armature of the contacts of the indicator being displaced on either side at a certain frequency corresponding to that of the signals. In order to eliminate this effect, the invention may provide between the contacts of the position indicator 4 and the control relays R1 and R2 electric or electromechanical circuits C1, C2 of suitable form having sufficient time constant in order that the operation of the relays may be continuous, and not intermittent.

The adjustments of the elements controlling the turning of the vehicle must be made so that the turning can restore the vehicle into the beam in spite of a wind of known strength, but it is clear that the turning which must be imposed on the vehicle is not continuous, but must impart such a change of direction that the new direction can intersect the beam again, preferably at a small angle.

In accordance with one of its features, the invention provides means for rendering the relays R1 and R2 ineffective when the turning effected by one of them has caused the vehicle to follow a direction forming an angle of 15° with its original direction, this angular variation of the route being sufficient to bring the vehicle back into the beam. Two main devices may be employed for this operation. Firstly, as the turning obtained by means of a system of automatic piloting is a precise angular function of time, a time delay relay such as 103 or a relay with clock movement or any other known retardation system may be inserted between the relays R1 and R2 and the turning relay 12 of the pilot, or the electrical relay actuating this turning relay when of any kind other than electrical. This retardation device, at the end of a certain time interrupts the action of the relays R1 and R2, the vehicle then continuing in a straight line without any intervention, however, by the course repeater since one of the relays R1 or R2 remains operated and the circuit of said course repeater remains open until it is closed by the de-energisation of the relay R1 or R2 when the vehicle enters the beam, and consequently, actuates said course repeater or restores control of the piloting system to the directional gyroscope or compass. In another way, the turning may be stopped by a device sensitive to the angular variation of direction of the axis of the vehicle by means, for example, of a restoring device such as the following.

In any automatic piloting system a gyroscope permits the vehicle to maintain a stable direction automatically for a certain time. This gyroscope is governed by the turning relay in order to cause the vehicle to rotate through the desired angle, either manually or by means of an adjustable course repeater which acts on the gyroscope until the vehicle has taken the course imposed by the repeater.

The course repeater is provided with a contact device, or photo-electric cell device, or other device which actuates the turning relay in a direction corresponding to the desired rotation of the vehicle, according to whether the vehicle is drifting to the right or to the left of the desired course. This device acts and influences the control of the vehicle when in the system described above neither of the two relays R1 and R2 is energised, that is to say, when the vehicle is in the directional beam. This device is provided so that the position of the contacts may be adjusted over a complete circumference so as to give the possibility of adjusting the direction of route of the vehicle on any possible course around the circumference.

A purely illustrative example of such a device is shown in Fig. 3. In this figure the relays R1 and R2 respectively only comprise a normally open contact device 9, 10 respectively, these contact devices 9 or 10 being in series with each other through two similar windings E1 and E2 in series, a point between these two windings being connected to a source of current supply S2, the other pole of which is connected to both the armatures or movable contact of the relays R1 and R2. Between the windings E1 and E2 there is arranged a rotatable member P carrying a brush 15 which is adapted to wipe on the sectors C1 and C2 which are secured in a fixed or adjustable manner to the course repeater 13. The sectors C1 and C2 of the course repeater 13 form a split-ring commutator which is controlled by the directional element of the automatic piloting system 102, as represented by the dotted line 102a.

This member P is attracted when one of the windings E1, E2 is energised to positions respectively defined by fixed or adjustable stops B1 and B2. The zero position is normally defined by means of the spring 16a stretched between terminals 17. The brush 15 is connected to a terminal of the source of supply S1, the other terminal of which is connected to the middle point of the double winding of the banking relay 12. The two ends of this winding 12 are respectively connected by bearing contacts 14 and 16 contacting with two continuous conducting rings 18 and 20 insulated from each other. The ring 18 is provided with a contact 19 which follows the surface of the sectors C1 and C2 and the ring 20 is in the same way provided with a contact 21 following the surface of the sectors C1 and C2, these contacts being diametrically opposite.

When the vehicle is moving in the directional beam the contact 4 is in its normal rest position, the energisation circuits of the relays R1 and R2 are open and the contact 15 being located in the space between the two conducting sectors C1 and C2, none of the circuits passing through these sectors is closed and, consequently the turning relay 12 is not energised. When the vehicle leaves the directional beam the contact device 4 is closed in one of its positions, and one of the relays R1 and R2 operates, thus causing current to pass in one of the windings E1 or E2. This energised winding attracts the member P against the relevant one of the stops 17, driving the wiper 15, and consequently bringing it on to one of the conducting sectors C1 or C2 which closes an energising circuit in one of the coils 12 for the turning relay, or the control relay of the turning device which operates in the corresponding direction. The vehicle starts turning and continues until the course of the vehicle is such that the course of the repeater 13 has turned through the angle through which the brush 15 has been displaced. When the part C3 between the sectors C1 and C2 is moved under the brush 15, the energising circuit of the turning relay 12 is opened. The vehicle then continues in a straight line with one of the relays R1 or R2 energised as long as it has not returned to the beam 2. When the vehicle again enters the beam, the contact 9 or 10 which was formerly closed will open, and the relay R1 or R2 will be deenergised, thus releasing the member P which returns to its normal or zero position under the action of the spring 16. This normal position is such that the brush 15 is on the conducting sector opposite that to which it was brought by its previous displacement. The turning relay of the vehicle is then actuated in the reverse direction until the space between the sectors is brought under the brush 15 and the energising circuit of the relay 12 is opened. The vehicle has thus automatically resumed a course parallel to the geographical course of the beam, or true course, or the manually or automatically corrected course for the angle of drift if this drift is not negligible.

The angular distance between the stops B1 and B2 is chosen in accordance with the type of the vehicle and the width of the directional beam, that is to say, in accordance with the sensitivity of the indicator 4. Moreover, the course to be maintained in the beam and the two lateral boundary lines may be displaced and adjusted en bloc by modifying the position of all the four stops B1, B2, 17, 17.

Arrangements of this type may equally be carried out by means of moving contacts and an armature connected in a fixed or adjustable manner to the course repeater. In this case, however, the condition of use over the whole circumference would be more difficult to obtain.

The same operation could be obtained with three series of contacts on the course repeater, two normal contacts for maintaining the course in the beam, and two contacts on each side at the turning angle chosen, and put into use, one group through the relay R1 and the other through the relay R2. It is also clear that the system shown in Fig. 3 has only been shown by way of illustration, and that any system of reading a course repeater or a magnetic compass or a gyroscope may be employed, whether this reading is effected by photo-electric cells and luminous rays, by vibrating contacts or in any other manner.

In another possible arrangement the relays R1 and R2 may be combined in a single relay.

In further arrangements the functions considered hereinabove may be carried out by purely mechanical or electro-mechanical arrangements with the interpolation of any motors or servomotors which may be necessary.

As the width of the beam transmitted by a radio-beacon such as that indicated on the position indicator on board a vehicle varies with the distance from the radio-beacon, it is important that the angle of turning should be adjusted in accordance with the width of the beam, either in a continuous manner, or by degrees. The invention, consequently, provides systems such as those described above, in which the value of the angle of turning is regularly modified, or by degrees as a function of time, by means, for example, of clock mechanism actuating either regularly or step-by-step, electric, pneumatic or hydraulic relays, or servo-motors acting on the adjustment of the gyroscope or the course repeater, these movements being set in action either automatically, by the contacts 4 for example, or manually by the pilot when the vehicle intercepts a beam for the first time.

These same means of adjustment of the angle or radius of curvature of the turning or separate means, may in accordance with another feature of the invention, be provided in order to modify as a function of time the apparent width of the direction beam in a continuous or intermittent manner by modifying the sensitivity of the radio position indicating apparatus.

An example of navigation in accordance with the invention is shown by way of example in Fig. 4 of the drawings. In this figure the radio-beacon 1 emits a directional beam 2 serving to guide a vehicle such as an aeroplane 3 of which the route is indicated in dotted lines. When the aeroplane arrives in the directional beam 2, it is following a route 20. As soon as the radio indicator gives the pilot the indication that the aeroplane has entered the beam of the radio-beacon, the pilot sets going the automatic piloting and predetermines the direction of the vehicle according to the known geographical course of the radio-beacon. The aeroplane then performs a turning 21, until the moment when its route arrives on the boundary of the beam and by means of the gyroscope of the automatic piloting system the vehicle follows a route 22 parallel to the axis of the beam. This route 22 again crosses the boundary of the beam as defined by the radio position indicator. At this moment one of the relays R1 or R2 is energized and causes a fresh turning or change of direction of the aeroplane 3. By an arrangement of similar operation to that of Fig. 3, the action of the turning is eliminated, while the aeroplane is in the beam after having rotated at a certain angle, and it is then brought to a route parallel to the axis of the beam 2 by the action of the automatic piloting system with predetermined course which restores it to this route 25 by turning in the reverse direction 24 to the previous direction. These operations will be repeated until the aeroplane reaches the landing ground in front of the radio-beacon, for example.

Although the invention has been described in the case of some specific embodiments it is not in any way limited thereto, but on the contrary, is capable of numerous modifications and adaptations without departing from its scope.

What is claimed is:

1. A radio guide system for controlling a moving vehicle of the kind employing a radio beam directed along a predetermined direction and radiating different characteristic signals on the right and on the left of the beam, comprising an automatic piloting system for the vehicle including a compass for controlling said system to steer said vehicle along a set geographical course, detecting means carried by said vehicle for producing a selective response to one of said characteristic signals when said vehicle is caused to leave the axis of said beam and enter the zone of one of said characteristic signals, means controlled by the selective response of said detecting means for interrupting control of said system by said compass and for controlling said piloting system to steer said vehicle back into said beam, and restoring means rendered operative a predetermined time after operation of said detecting means for restoring control of said piloting system to said compass means.

2. A guide system according to claim 1 wherein said restoring means comprises a time delay relay energized by the selective response of said detecting means and being operative after a predetermined time to render a said detecting means ineffective to control said piloting system and to render said compass means effective for controlling said piloting system.

3. A guide system according to claim 1 wherein said restoring means comprises compass means responsive to a predetermined turning of the vehicle from said set geographical course for rendering said detecting means ineffective to control said system and restoring control to said compass means.

4. A radio guide system for controlling a moving vehicle of the kind employing a radio beam directed along a predetermined direction and radiating different signals on the right and on the left of the beam comprising an automatic piloting system for the vehicle including means for controlling the steering mechanism to steer the vehicle along a set geographical course comprising a compass and a course repeater operated by said compass and consisting of a rotary split-ring commutator having a normally stationary brush cooperating therewith, the two segments of said split-ring and said brush being arranged to control circuits for energizing the steering mechanism to maintain said vehicle on said course, said brush being mounted upon a movable member biased to a normal position and arranged for a predetermined rotary movement to either side of its normal position, means carried by said vehicle for detecting said beam and producing a selective response when said vehicle tends to depart from said beam on either side thereof and enters the zone of one of said different signals, and means controlled by the selective response of said detecting means for operating said movable member to one side or the other of its normal position thereby energizing said steering mechanism in a direction to cause said vehicle to be steered back into said beam.

HENRI GASTON BUSIGNIES.